Figure 1:
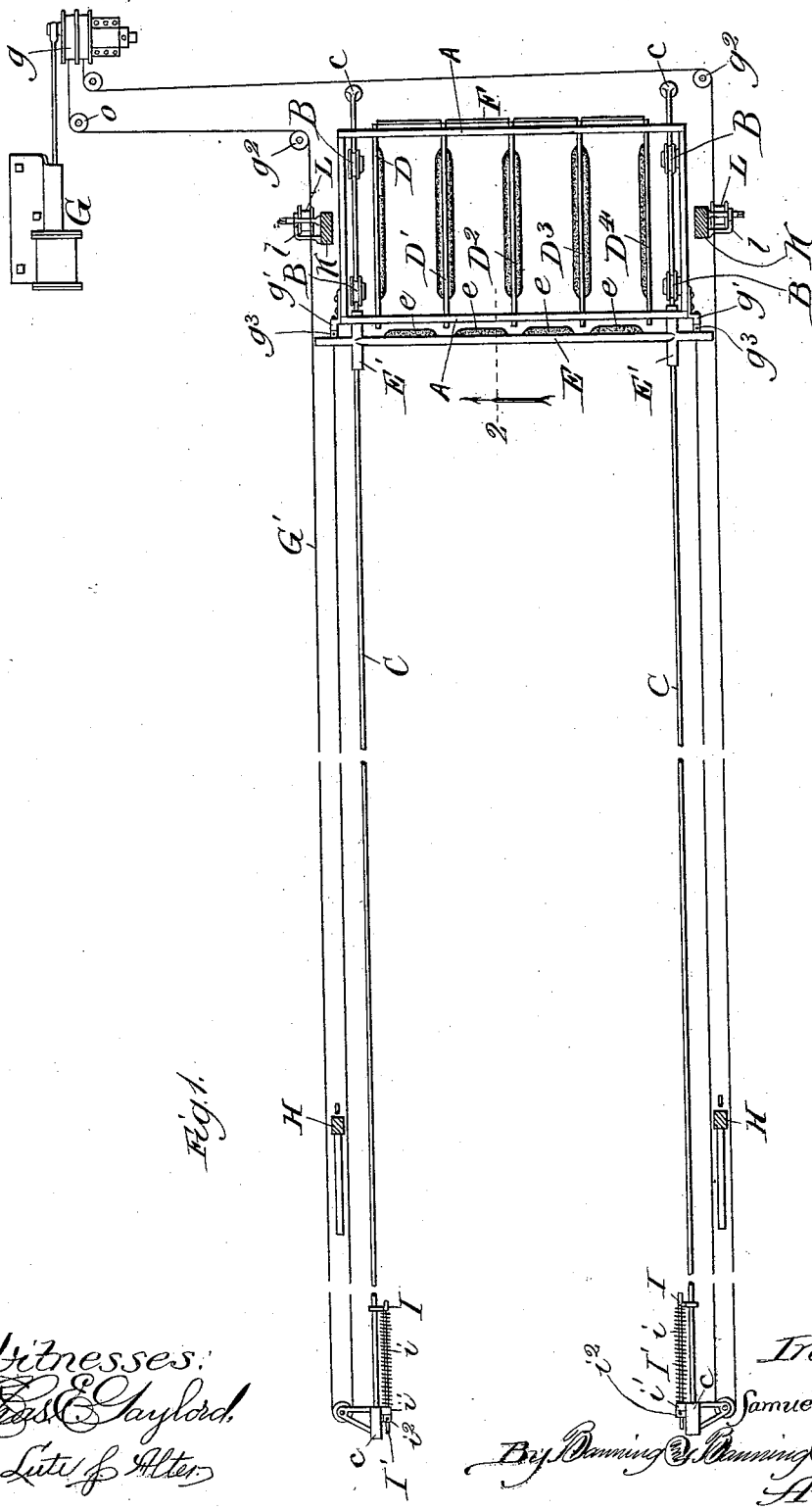

(No Model.) 3 Sheets—Sheet 1.
S. B. WHITEHEAD.
TRAINING APPARATUS.

No. 529,987. Patented Nov. 27, 1894.

Witnesses:
Chas. E. Gaylord.
Luth & Alter.

Inventor:
Samuel B. Whitehead,
By Banning & Banning & Sheridan,
Attys.

(No Model.) 3 Sheets—Sheet 2.
S. B. WHITEHEAD.
TRAINING APPARATUS.
No. 529,987. Patented Nov. 27, 1894.
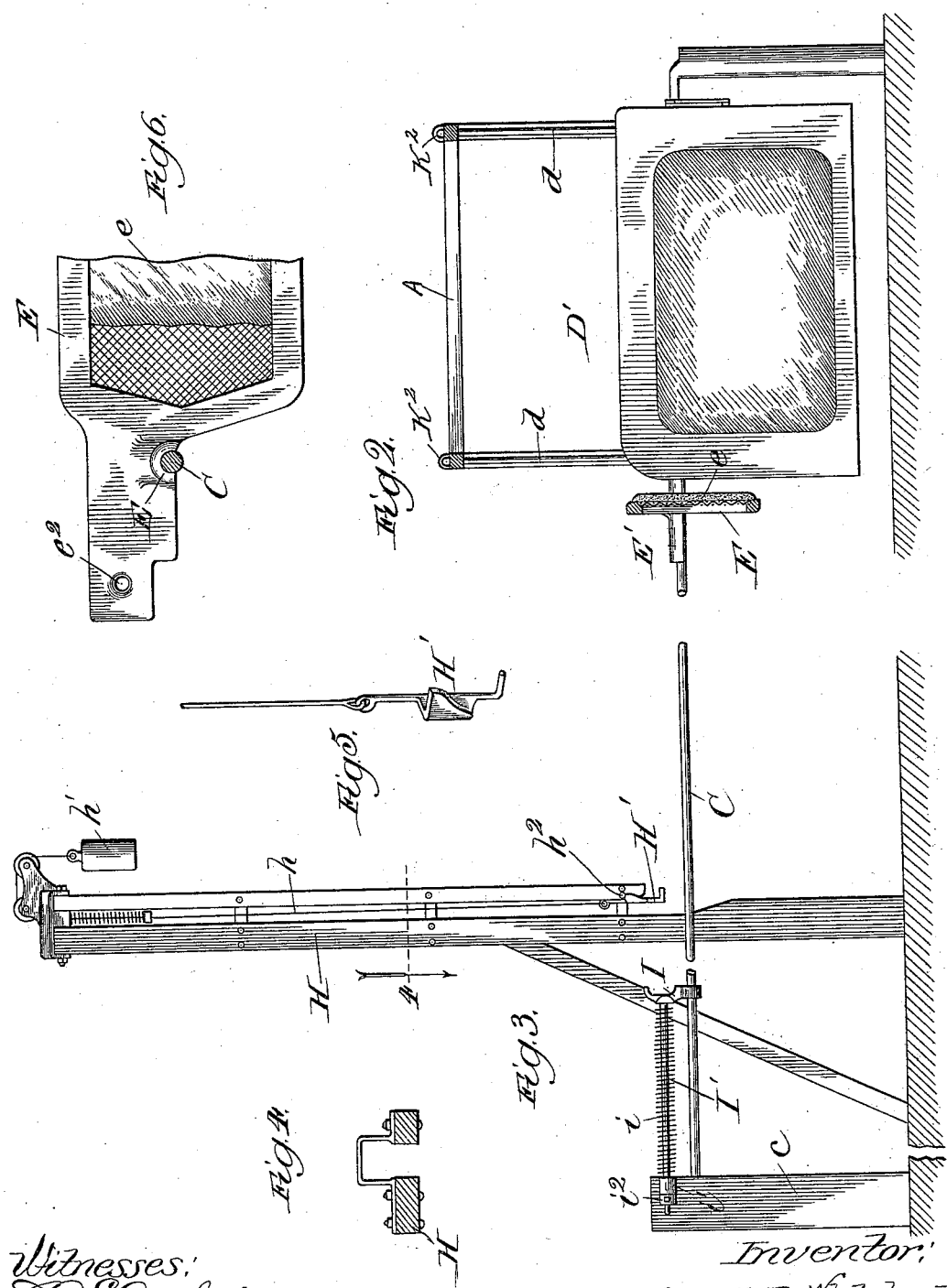
Witnesses:
Chas E. Gaylord,
Lute C. Alter
Inventor:
Samuel B. Whitehead,
By Banning & Banning & Sheridan,
Attys.

(No Model.)                    S. B. WHITEHEAD.            3 Sheets—Sheet 3.
                                 TRAINING APPARATUS.
No. 529,987.                                    Patented Nov. 27, 1894.
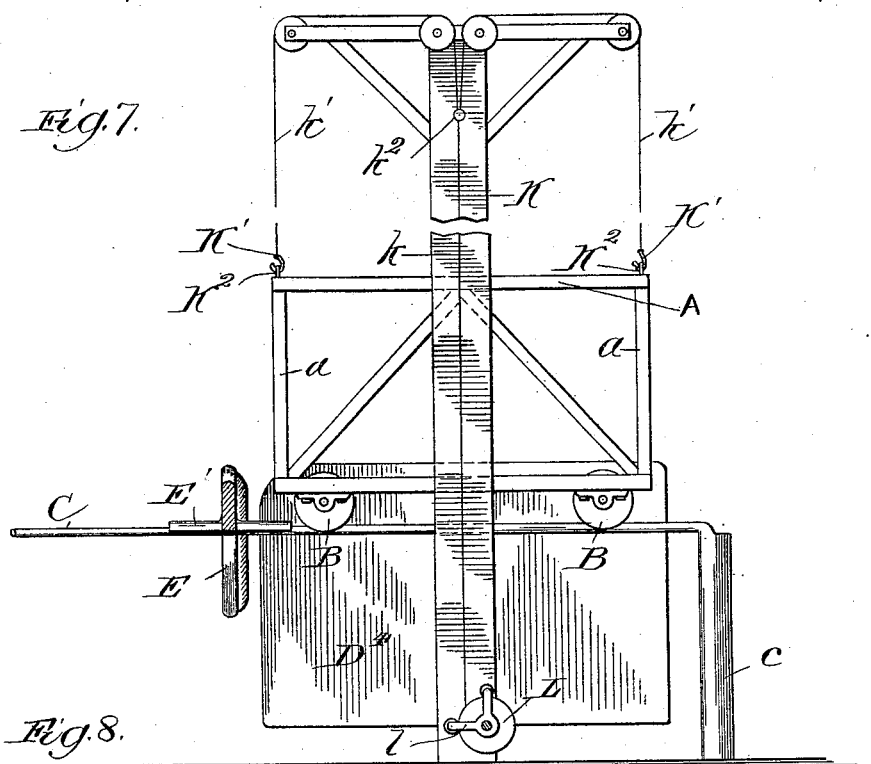
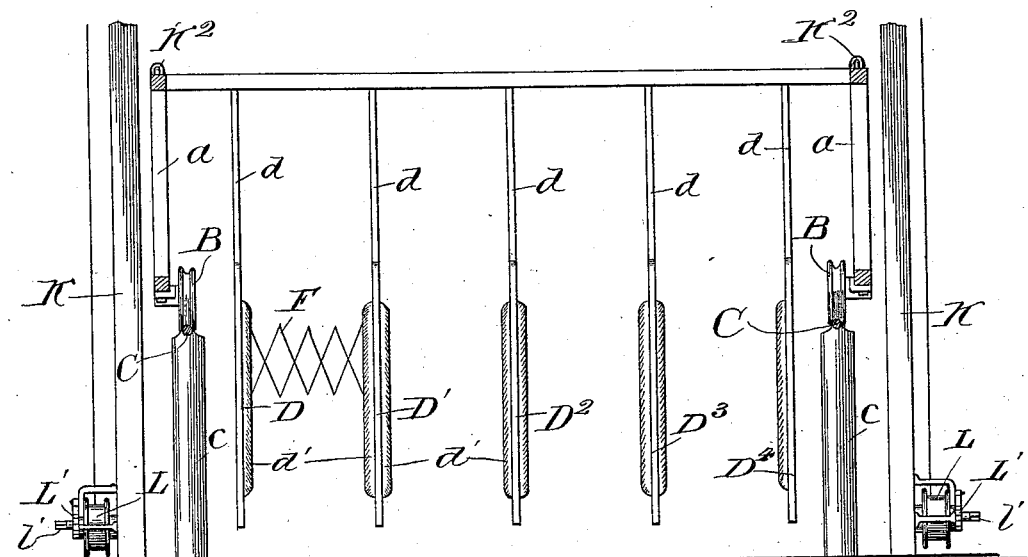
Witnesses:                                           Inventor:
                                                Samuel B. Whitehead,
                                            By Banning & Banning & Sheridan,
                                                     Attys.

UNITED STATES PATENT OFFICE.

SAMUEL B. WHITEHEAD, OF SAN FRANCISCO, CALIFORNIA.

TRAINING APPARATUS.

SPECIFICATION forming part of Letters Patent No. 529,987, dated November 27, 1894.

Application filed June 28, 1894. Serial No. 516,028. (No model.)

*To all whom it may concern:*

Be it known that I, SAMUEL B. WHITEHEAD, of San Francisco, California, have invented a certain new and useful Improvement in Training Apparatus, of which the following is a specification.

My invention relates especially to the apparatus intended to be used in connection with refractory horses for the purpose of teaching them how to start properly and prevent balking, backing or kicking to the injury and danger of other horses that may be in a field or on a race track.

The object of my invention is to provide a simple, efficient and economical apparatus by which horses may be trained to start properly; and it consists in the features and combinations hereinafter described and claimed.

In the drawings, Figure 1 is a plan view of my improved apparatus; Fig. 2, an enlarged sectional detail, taken on line 2 of Fig. 1; Fig. 3, an enlarged vertical detail of a portion of the apparatus shown to the left hand of Fig. 1; Fig. 4, an enlarged detail, taken on line 4 of Fig. 3; Fig. 5, an enlarged perspective view of a portion of Fig. 3, showing the lifting mechanism; Fig. 6, an enlarged detail of a portion of the vertical gate shown to the left of Fig. 2; Fig. 7, an enlarged side elevation of the mechanism for raising the apparatus from the ground; and Fig. 8 an enlarged rear view of Fig. 7.

It is a well-known fact that in the training or breaking of thoroughbred horses for the race track, the greatest difficulty is encountered in teaching them to start properly, especially when there are a number of such horses on the track or in the field. There are always some vicious horses in a crowd, who, with their kicking and biting proclivities endanger the life and limbs of the other animals as well as their riders. Again, when horses are brought to the starting line, some will back and jump and others will get away in the lead, causing an endless amount of confusion and trouble, as well as the loss of considerable time in getting the horses properly started. To avoid the above objections and provide a machine by which one or more horses are compelled to start in compliance with the wish of the starter in charge of them, is the principal object of my invention.

In constructing my improvement, I provide a frame-work, A, suspended above and across a raised track, or any desired locality, on trolleys, B, which, in turn, are supported on and adapted to be moved in a longitudinal direction upon tracks, C, supported above the ground, as shown in Figs. 3 and 7, in any desired manner—preferably by means of posts, $c$. Suspended from this frame—see Figs. 1 and 8—are a number of partitions, D D' $D^2$ $D^3$ and $D^4$, by means of tubing, $d$, which rigidly suspends these partitions so that they have very little, if any, lateral motion. These partitions, therefore, divide the space of the track between the upright, supporting portions, $a$, of the frame, into any desired number of stalls, in which may be placed a horse and his rider, for the purpose of starting in a race or breaking the animal in, to acquire the proper knowledge in starting. These partitions above referred to are padded at $d'$, so that should either the horse or rider be thrown against them, they will not be materially injured. Immediately in front of these stalls, and at about the height of a horse's head, I place a movable screen, E, having its frame portion made of any light material, and the main portion—as at $e$—of wire mesh, though I do not desire to be limited to the use of any material. This movable screen is provided at each end with grooved supports, E', which rest on the track, C, along which it is moved when the stalls are moved.

To force the horses along when the stalls are moved forward, I provide the rear portion of each stall with a gate, F, made preferably of pieces of metal pivoted together in a "lazy-tong" manner, having one end pivoted to the framework of the stall and the other provided with a catch to catch the opposite stall of the frame, so that when it is necessary to lead a horse into the stall such gate may be opened, the horse and rider driven in, and the gate afterward closed. I prefer to provide each stall with an independent gate so that only those stalls necessary to be used need be opened; but I do not desire to be limited to an independent gate, as it is evident one gate might be used to close all of the stalls simultaneously, or two gates may be used—or as many gates as desired; and while I desire to make the gate in a "lazy-tong" manner, it is evident to those skilled in the art that other styles of gate might be used.

To propel the apparatus along at the desired speed, I provide a motor engine, G, having its piston rod connected to a rotating drum, $g$, to which is secured a cable or rope, G′, which has its other end secured, as shown in Fig. 1, to the framework of the apparatus at $g'$. This rope or cable is passed around suitable pulleys, $g^2$, which take up the slack in such cable and give it the required tension, and also to more readily facilitate the operation of the cables. I provide the cable with an adjustable collar, $g^3$—see Fig. 1—against which the screen gate, E, rests, so that as the motor is started and the cable wound up, the apparatus is moved along on the track, carrying with it the screen gate. This adjustable collar may be made of any convenient form, but I prefer to make it of an ordinary collar having a central opening and set screw for securing it in any desired portion of the cable.

When the desired momentum has been acquired by the apparatus and the horses are moving along readily therewith, it is necessary to raise the screen gate, E, out of the way, so that the horses may move out of the stalls if they desire and the stalls be moved along a short distance farther—say from twenty to fifty feet. To accomplish this, I provide upright posts, H—located to the left of the apparatus as shown in Fig. 1, and at each side of the track. Suspended from this upright, over suitable pulleys, is a cord, $h$, provided at one end with a catch, H′, and at the other end with a weight, $h'$, so that as the starting apparatus nearly reaches its limit of motion, the screen gate will contact the catches, H′, which are normally held in a down position by means of a pin, $h^2$, on a portion of the upright post. The catches enter the opening, $e^2$, in the screen frame, and as the screen is propelled along, it releases the catches from their retaining mechanism. The weights are then thrown into action and the gates immediately lifted out of the way of the horses, so that they can pass out at the front of the stalls. The rest of the machine is carried along farther until it contacts the cushion stops, I, which serve to prevent any destroying shock to the mechanism. These cushion stops are made preferably of an upright extending portion, I, provided with a perforation through which the track, C, is passed, and which is supported by the tracks. They are also provided with longitudinal bars or rods, $i$, which extend through perforated lugs, $i'$, in one of the upright posts. Intermediate such lugs and the stop proper are interposed spiral springs, I′, which serve to hold the stops in their forward position and act as a cushion to the moving apparatus. The longitudinal bars, $i$, are provided with ordinary collars and set screws, $i^2$, for the purpose of adjusting the stops to their proper positions.

When it is desired to use the track or field without this starting or training apparatus, some means must be provided to remove the apparatus from the track, and at the same time permit it to be readily replaced thereon. To accomplish this result, I provide two vertical posts, K—located to the right of Fig. 1—on each side of the track. Passed over suitable idler wheels at the upper end of the posts, K, is a cable or rope, $k$, preferably divided at its upper portion into two parts, $k'$, which join the main rope at $k^2$. These portions of the cable, $k'$, are provided with hooks, K′, which engage eyes or perforated pieces, K², on the frame portion of the apparatus. The lower end of the cord is passed around a windlass or winding drum, L, which is secured to the upright in any convenient manner, preferably by means of a bracket or frame, $l$. This windlass is provided with a pawl or ratchet, L′, as shown in Fig. 8, and its rotating shaft with a square end, $l'$, to which may be secured a crank handle for the purpose of turning the drum. An operator is stationed at each side of the track, and by winding the drum the apparatus is lifted from the track to any suitable height to be out of the way of running horses until it is again desired to use the apparatus. Instead of using two drums at each side of the track, I may use one and have the cord or cable passed across the track, so that one operator may raise the entire mechanism simultaneously and prevent buckling or tipping; or, if desired, the windlass may be connected to the same motor that propels the apparatus along the track, and thus be operated by mechanical power or energy.

In operation, the apparatus is lowered onto its track. The screen gate, E, is also lowered and brought into the position shown in Fig. 1; the gates, F, opened, and as many horses and riders driven into their separate stalls as desired. The gates are then closed, and the starter or person having it in charge gives the signal of "ready," and—if an electric motor be used—may start the mechanism going. If the horses be unruly or balky, the gate, F, coming behind them, strikes them and pushes them along until, in order to keep ahead of the mechanism, they acquire the desired momentum or speed, when the screen gate striking the mechanism above described is raised instantaneously out of the way and the horses started. After the horses have been started, the machine is run back on the same tracks to its initial position, raised up out of the way, and lowered when desired to again use it. In this manner of starting or training it will be seen that each horse, in occupying a reserved or special portion of the track or field, is under the control of the starter and cannot run away. Neither can he in any way injure another horse or rider, so that my improvement has the additional advantage of safety to the horse and rider, which is now a large and important factor in the training, racing or breaking of horses.

While I have entered into a more or less minute description of the details of my invention, I do not desire to be limited thereto unduly, any more than is pointed out in the claims. On the contrary, I contemplate all proper changes in form, construction and arrangement, the omission of parts, and the substitution of equivalents, as circumstances may suggest or render expedient.

I claim—

1. In a horse starting machine, the combination of a track upon which the machine is moved and mounted, and a frame portion mounted on and adapted to be moved on such track and provided with two or more individual stalls, substantially as described.

2. In a horse starting machine, the combination of a track, a frame mounted and adapted to move on such track, and several partitions secured to such frame to form two or more individual stalls, substantially as described.

3. In a horse starting machine, the combination of a track upon which the mechanism is moved, a frame portion provided with two or more individual stalls mounted on and adapted to be moved on such track, and means for propelling the machine, substantially as described.

4. In a horse starting machine, the combination of a track upon which the machine is moved and mounted, a frame portion mounted on and adapted to be moved on such track, several partitions secured to such frame to form one or more stalls, a removable gate in front of the stalls, means for removing such gate at a desired position, and means for propelling the machine on its track, substantially as described.

5. In a horse starting machine, the combination of a track upon which the machine is moved and mounted, a frame portion mounted on and adapted to be moved on such track, several partitions secured to such frame to form one or more stalls, a removable gate in front of the stalls, means for removing such gate or gates simultaneously at a desired position, means for closing the rear of the stalls to force the horses along, and means for propelling the machine, substantially as described.

6. A horse starting machine, comprising a track upon which the machine is moved and mounted, a frame portion mounted on and adapted to be moved on such track and provided with several stalls, and means for raising such frame portion with its stalls up and out of the way, substantially as described.

7. A horse starting machine, comprising a track upon which the machine is moved and mounted, a frame portion mounted on and adapted to be moved on such track and provided with one or more stalls, means for propelling the frame along its track, and a cushion stop for such frame, substantially as described.

SAMUEL B. WHITEHEAD.

Witnesses:
THOMAS F. SHERIDEN,
THOMAS B. MCGREGOR.